United States Patent [19]
Bailey, Jr.

[11] 3,972,030
[45] July 27, 1976

[54] PERIPHERAL CONTROL CAPABLE OF DYNAMICALLY EXECUTING COMMAND SEQUENCES

[75] Inventor: Myrl Kennedy Bailey, Jr., North Billerica, Mass.

[73] Assignee: Honeywell Information Systems, Inc., Waltham, Mass.

[22] Filed: Jan. 2, 1975

[21] Appl. No.: 537,993

[52] U.S. Cl. .......................................... 340/172.5
[51] Int. Cl.[2] ........................................ G06F 9/16
[58] Field of Search .............................. 340/172.5

[56] References Cited
UNITED STATES PATENTS

| | | | |
|---|---|---|---|
| 3,839,705 | 10/1974 | Davis et al. | 340/172.5 |
| 3,889,242 | 6/1975 | Malmer, Jr. | 340/172.5 |
| 3,930,236 | 12/1975 | Ferguson et al. | 340/172.5 |

*Primary Examiner*—Gareth D. Shaw
*Assistant Examiner*—C. T. Bartz
*Attorney, Agent, or Firm*—Faith F. Driscoll; Ronald T. Reiling; Nicholas Prasinos

[57] ABSTRACT

A microprogrammed peripheral controller in response to a command executes a sequence of microprogram routines stored in a read only memory normally provided for execution of peripheral control commands, based upon the state of various status indicators included in the peripheral controller. The controller automatically executes only those microprogram routines required to accomplish a given operation in the correct sequence by employing operation phase code bits stored in a scratch pad memory. The code bits are updated after execution of each microprogram routine and upon being changed to a predetermined state signal the controller when the given operation has been completed.

23 Claims, 4 Drawing Figures

3,972,030

PERIPHERAL CONTROL CAPABLE OF DYNAMICALLY EXECUTING COMMAND SEQUENCES

DOCUMENTS INCORPORATED BY REFERENCE

1. Copending patent application of Myrl Kennedy Bailey, Jr. and George J. Barlow titled "Retry Method and Apparatus for Use In A Magnetic Recording and Reproducing System" bearing Ser. No. 536,281 filed on Dec. 24, 1974 and assigned to the same assignee as named herein.

2. Copending patent application of Myrl Kennedy Bailey, Jr. titled "Improved Microprocessing Method and Apparatus" bearing Ser. No. 536,126 filed on Dec. 24, 1974 and assigned to the same assignee as named herein.

BACKGROUND OF THE INVENTION

1. Field of the Invention

This invention relates to peripheral controllers and more specifically to microprogrammed peripheral controllers.

2. Prior Art

In carrying out certain types of input/output operations, it becomes necessary for a peripheral controller of a subsystem to execute a series of commands in order to complete the particular operation. For example, during system initialization, a peripheral controller can be selected as a "bootload device". When selected, the peripheral controller is required to execute those operations for reading in resident programs and data into the main store of a data processing system. In addition to this, the peripheral controller may be required to execute a series of commands as part of diagnostic or test operations.

In general, systems have included special routines in either the data processing system or in the peripheral subsystem for generating the commands necessary for carrying out operations involving execution of a series of commands. When these routines are required to be included in the peripheral controller, this results in considerable increase in the control storage, requirements of the controller. In addition to increasing control storage requirements, these arrangements can be inefficient particularly when either a number of large routines required is high or when the routines involved include a considerable number of instructions.

According, it is a primary object of the present invention to provide a method and apparatus for enabling a peripheral subsystem to execute a series of operations efficiently.

It is a further object of the present invention to provide an apparatus for enabling a microprogrammed controller to execute a sequence of commands with minimum increase in its control storage requirements.

SUMMARY OF THE INVENTION

The above objects of the present invention are achieved in a preferred embodiment which includes a peripheral controller coupled to control the operation of a selected one of a plurality of magnetic storage devices. The controller includes a read only memory which stores a plurality of microprograms required for executing commands received from a data processing system involving a selected one of the plurality of devices. The peripheral controller also includes storage for indicating the status of the device in addition to the status results of operation performed by the controller. Storage is also included for indicating the particular phase of an operation being executed by the controller. In the preferred embodiment, an operation phase code consisting of a plurality of bits is initially stored in response to a command and modified by the controller during the execution of a sequence of microprograms normally used to execute commands received from the data processing system. When the operation phase code reaches a predetermined value, the controller is signalled that it can terminate the operation.

By employing such a code, the controller is able to share all of the microprograms normally required thereby reducing to a minimum the storage requirements of the controller. Only those microinstructions required for initializing, modifying and testing the operation phase code are required to be included in the control store.

These and the other objects, advantages and features of the present invention will become readily apparent from the following description when considered in connection with the drawings.

DETAILED DESCRIPTION OF THE PREFERRED EMBODIMENT

Figure 1:
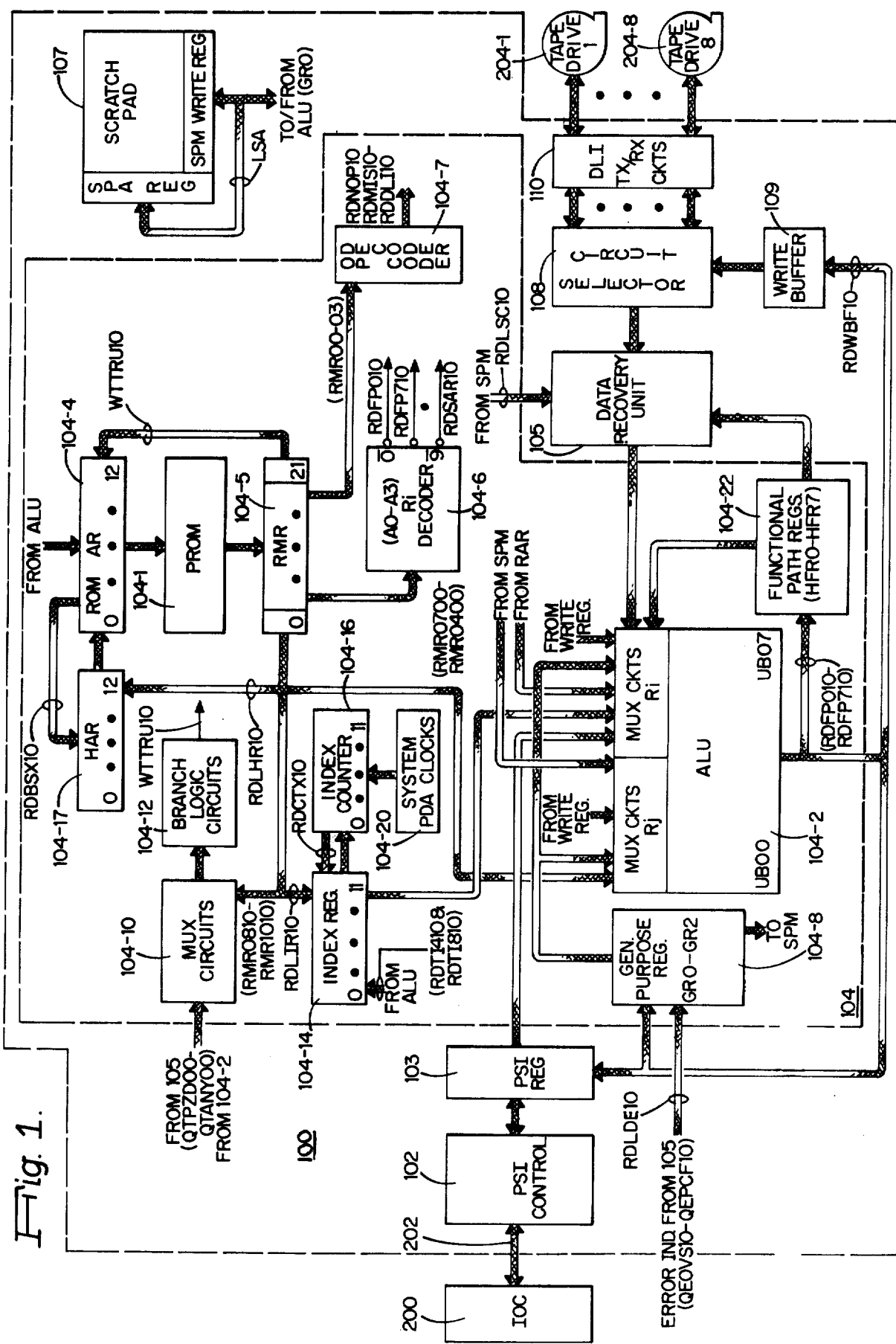
FIG. 1 shows in block diagram from a peripheral subsystem which employs the principles of the present invention.

FIG. 1 shows a peripheral processor or peripheral controller 100 which couples to a central processing unit of a data processing system via an input/output processor (IOC) 200. The peripheral controller 100 in response to commands received from the IOC 200 processes data characters received from any one of a number of magnetic tape devices/drives 204-1 through 204-8 via a selector circuit 108. The information characters or frames read from a selected magnetic tape device is processed by a data recovery unit 105. Information to be written on the magnetic tape device is transferred via the ALU 104-2 to a write buffer 109 and thereafter applied to the selected drive via selector circuit 108.

Commands and data are transferred between the IOC 200 and the peripheral controller 100 via a peripheral subsystem interface (PSI) 202. Such transfers are made in response to control signals generated by circuits included within the IOC 200 and the PSI control 102. For the purpose of the present invention, the circuits can be considered conventional in design. For example, the circuits may take the form of the circuits described in a copending patent application titled "Microprogrammable Peripheral Processing System" invented by John A. Recks, et al. bearing Ser. No. 425,760 which was filed Dec. 18, 1973, now U.S. Pat. No. 3,909,799 and is assigned to the same assignee as named herein.

The PSI 202 includes an OPERATIONAL IN (OPI) line which is normally set to a binary ONE state whenever the peripheral controller is powered up and operational. The state of the OPI line signals the IOC 200 that the controller 100 is capable of accepting commands.

Similar to the PSI, commands and data are transferred between the tape devices and peripheral controller 100 via a device level interface (DLI). The tape devices can be considered conventional in design and include circuits to perform read and write operations.

As seen from FIG. 1, the controller 100 includes a microprogram processing unit 104 which under the control of microinstructions stored a programmable read only memory 104-1 performs the necessary operations for transferring information between a selected magnetic tape drive and the IOC 200. For example, in response to command code bytes received from the IOC 200, applied via the PSI control 102, PSI register 103 and an arithmetic and logic unit (ALU) 104-2, microinstructions are read out into a memory register 104-5 and decoded by decoder circuits 104-6 and 104-7. The decoder circuits cause a generation of various control signals which condition certain other portions of the controller 100 to perform operations necessary for executing the type of command specified.

Additionally, as seen from FIG. 1, signals from the memory register 104-5 are also applied to multiplexer circuits 104-10, conventional in design, which additionally receive control and status signals from other portions of the system such as the data recovery unit 105 and device for testing the results or progress of the particular operation as explained herein. Actual testing is accomplished by the branch logic circuits 104-12 which for the purpose of the present invention can be considered conventional in design. Also, signals representative of addresses contained within various types of microinstructions are applied from register 104-5 to a register 104-14 and an index counter 104-16. The register 104-14 is an index register which is loaded via register 104-5 in response to a subcommand signal RDLIR10 or via the ALU 104-2 in response to subcommand signal RDT410. The register 104-14 couples to an index counter 104-16 and is used to provide the required timing strobe signals necessary for writing or reading information characters to and from the write buffer 109 and the data recovery unit 105 respectively. The index counter 104-16 is decremented in response to PDA clocking signals generated by multi frequency system clock circuits 104-20. For the purpose of the present invention, these circuits can be considered conventional in design.

The register 104-17 is used as a history address register which allows proper sequencing through microinstructions stored in memory 104-1. For example, the history register 104-17 is operative to store a return branch address from the memory local register 104-5 until such time that the address is to be transferred to the read only memory address register 104-4. This address when transferred causes the register 104-4 to condition the memory 104-1 to select again a previous location within the memory allowing the continuance of a particular operation as explained herein.

As seen from FIG. 1, the ALU 104-2 receives and delivers signals to the registers shown. The signals which are to be applied as operand inputs to the ALU 104-2 are selected via multiplexer circuits included therein. The ALU 104-2 and multiplexer circuits can be considered conventional in design and may for example take the form of circuits disclosed in a text titled "The Integrated Circuits Catalog for Design Engineers", published by Texas Instrument, Inc., dated 1972.

The ALU 104-2 is connected to provide output signals to a plurality of functional path registers 104-22 which are used for control purposes such as for providing control signals to the data recovery unit 105 and storing hardware error conditions as explained herein. Each bit in each of the individual registers is used to indicate or to initiate a specific event or operation. The contents of these registers are examined by the microprogram processing unit via branch circuits in order to ascertain the state of the controller during an operation as well as being used for internal timing and for enabling the execution of commands.

Additionally, the ALU 104-2 is also connected to transmit and receive signals to and from a plurality of general registers 104-8 (i.e. registers GR0 through GR2) which are used for storage of certain record processing information. More specifically, register GR0 is used to control the transfer of input and output data signal to and from a scratch pad memory 107. Hence, it serves as a memory local register for scratch pad memory 107. Register GR1 serves as an input buffer register for the scratch pad memory 107. Also, register GR2, similar to register GR0, provides a temporary storage of information to be stored in the scratch pad memory 107.

The scratch pad memory 107 provides temporary storage for data, various control information and parameters required for executing read and write operations. As seen from FIG. 1 and mentioned above, both address and data are transmitted to and from the scratch pad memory 107 via the ALU 104-2 and general registers. The scratch pad memory 107 is of solid state construction and has 512 storage locations each containing 10 bit positions. The first 32 storage locations serve as a data buffer when the controller 100 is operating in a data mode (i.e. transferring or receiving data characters of a block). When in this mode, addressing of the scratch pad memory 107 takes place via a pair of address counter, write and read counters not shown. The contents of the read address counter are used to read out information from the locations on the scratch pad memory while the contents of the write address counter are used to write information into the scratch pad memory. For the purposes of the present invention, the operation of these counters for addressing the scratch pad memory 107 can be considered conventional in design.

The remaining storage locations of the scratch pad memory 107 are used for storage of device constants, control parameters for control of the controller and associated tape drives. More specifically, storage locations 020-03F hexidecimal are reserved, storage locations OEO-1FF serve as a device control block and are used to store control parameters in the form of device control block bytes including a retry count received from the data processing system, storage locations 080-OAF serve as a program block, storage locations OBO-OCF serve as register storage including temporary storage locations TS1, TS2, TS3 etc., and storage locations 06B-07F are used to store device constants (e.g. device 25 foot timer).

Additionally, the scratch pad memory can be addressed by a scratch pad address register which receives information from the ALU 104-2 and the register is used when either control constants and parameters are to be sent to portions of the controller 100 or used for updating certain status information previously stored in scratch pad memory 107.

DESCRIPTION OF OPERATION

As part of a system initialization procedure, the controller 100 is required to perform a boot load operation specified by a predetermined type of data transfer command (i.e. CCE). In carrying out the boot load operation, the controller is required to position the "loader" tape at the beginning of tape (BOT), space over the first tape mark and read the block folllowing the tape mark into the main store of the data processing system, not shown, via PSI bus 200.

Figure 2:
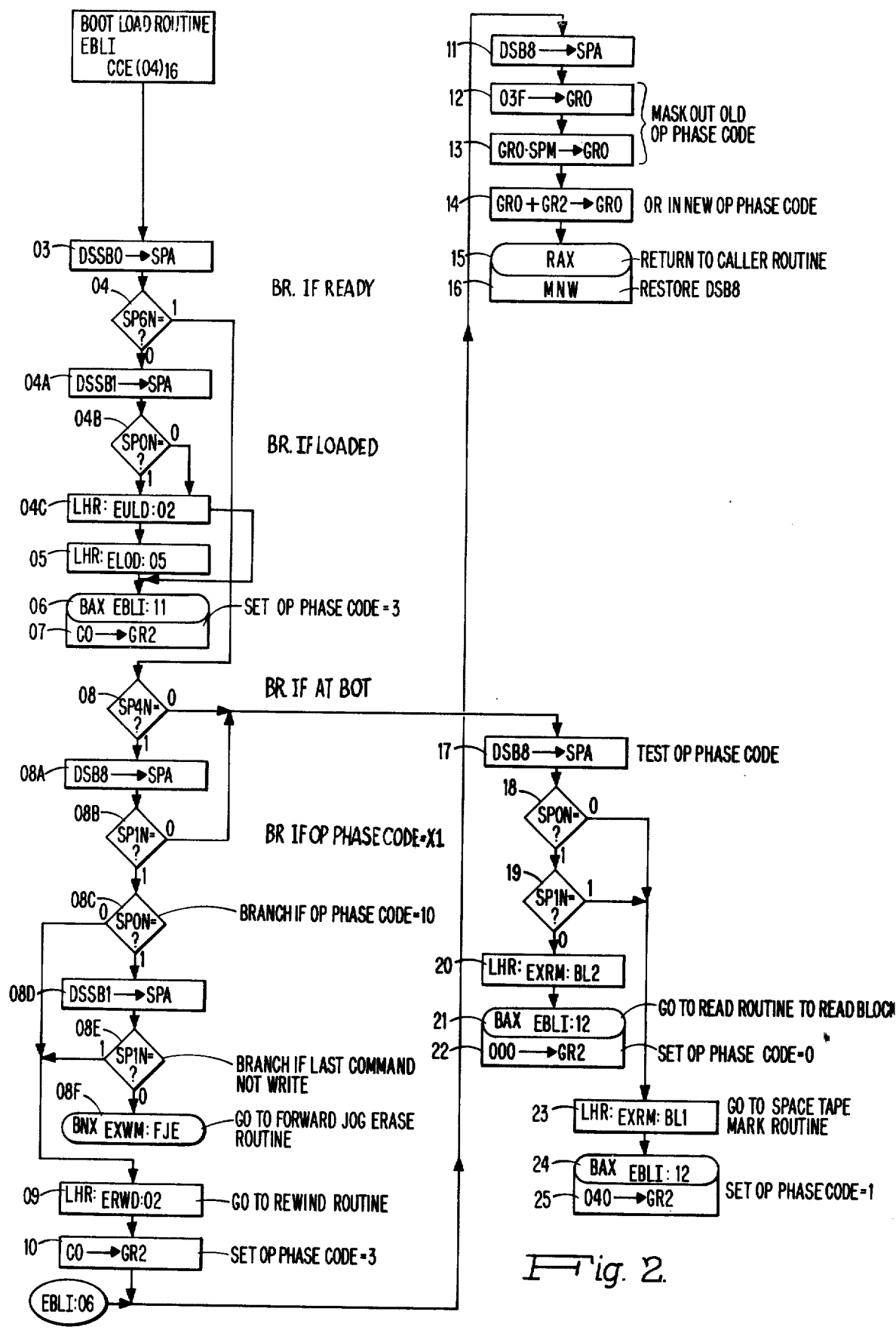
FIG. 2 is a flow chart showing a first type of operation used in illustrating the operation of the system of FIG. 1.

In accordance with the present invention, the controller 100 performs the operations indicated in the flow chart of FIG. 2. Before describing the operations, first the significance of various control bytes storage locations pertinent to processing commands in accordance with the present invention will be described.

As mentioned previously, certain ones of the storage locations of scratch pad memory 107 store status information which is referenced by the controller during the execution of commands. A first plurality of locations corresponds to the device status byte locations (e.g. 049-060 hexidecimal) which store information indicative of the status of the selected device. For example, the state of bit positions 6 and 4 of byte DSSB0 in location 049 indicates whether the device is in a standby state and at the beginning of tape (BOT) position respectively. The state of bit positions 0 and 1 of byte DSSB1 in location 04A indicate whether the device is loaded (i.e. tape reel has been placed on tape device) and whether the last command executed was a write command respectively.

A second plurality of scratch pad memory locations (e.g. 040-048) store detailed status bytes (e.g. DSB8 etc.). The three high order bit positions (i.e. bits 0, 1, 2) of the detailed status byte DSB8 store the operation phase code bits utilized in accordance with the present invention. As explained herein, these bits are modified by the controller 100 durings its execution of command routines and used to signal the controller when it has completed a particular operation.

Referring to FIG. 2, it is seen that the boot load routine controls selection of a plurality of routines which are as follows:

1. EULD = unload device if in standby and loaded;
2. ELOD = load device if in standby and not loaded;
3. EXWM:FJE — forward jog erase if last command = write;
4. ERWD = rewind if not at BOT;
5. EXRM:BL1 = space to tape mark; and,
6. EXRM:BL2 = read block.

As explained herein, the operation phase code for the various operations performed by different ones of these routines are as follows:

1. 110 = unload;
2. 110 = load;
3. 100 = rewind;
4. 010 = space to tape mark; and
5. 000 = read.

Figure 4:
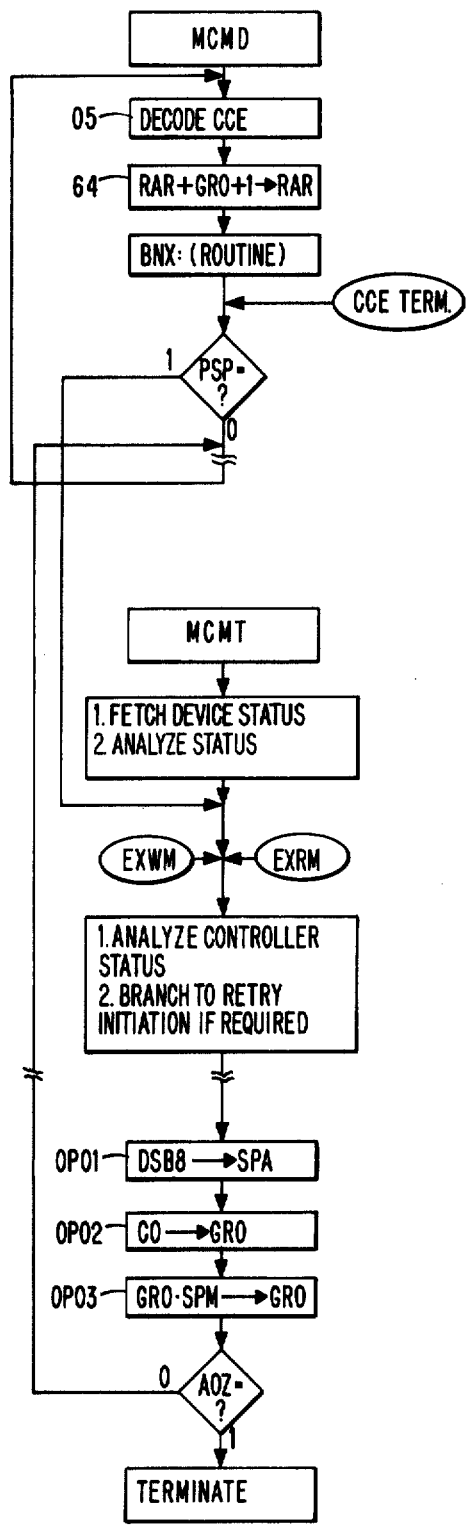
FIG. 4 is a flow chart showing a portion of one of the routines employed by the present invention.

The controller 100 unpon receipt of a command code byte from IOC 200 executes a command decode routine MCMD of FIG. 4 in which it references a command decode table in read only memory using the command code. This causes the read only store to branch to the bootload routine EBLI of FIG. 2 when the command code has a value of hexidecimal 04. The controller 100 executes microinstructions 03–04B which test status bytes DSSB0 and DSSB1 for ascertaining the state of the tape device selected. Based upon the state of the device, the controller executes a microinstruction 04C which loads the history register with starting location in the load routine ELOD when the device is in the standby state but not loaded. As seen from FIG. 2, the controller 100 executes microinstruction 07 which causes an operation phase code of 110 to be loaded into general register GR2 and then branches to a sequence of microinstructions 11-14 for loading the new op phase code into the high order three bit positions of DSB8.

Following the writing of DSB8 into scratch pad memory 107, the controller executes a branch microinstruction 15 which causes the previously loaded contents of the history register to be loaded into ROM address register for execution of the selected one of the routines EULD or ELOD.

Figure 3:
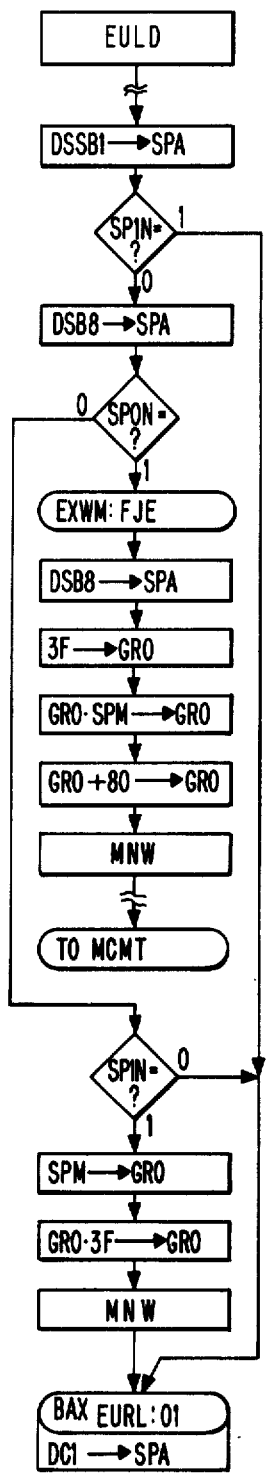
FIG. 3 is a flow chart showing a second type of operation used in illustrating the operation of the system of FIG. 1.

Assuming that routine EULD of FIG. 3 is selected, the controller 100 executes a sequence of microinstructions which test status byte DSSB1 to ascertain that the last command was not a write command in which case the routine proceeds in a conventional fashion (i.e. without reference to the operation phase code).

Assuming that it was a write command, the routine then checks the operation phase code to ascertain which routine or phase the controller 100 is to perform next (i.e. checks to establish what operations it has already performed). Specifically, when bit position 0 of the operation phase code is a binary ZERO, this indicates that the controller 100 has to perform a forward jog erase operation in which it executes routine EXWM:FJE. When bit position 0 of the operation phase code is a binary ONE indicating that routine EXWM:FJE had been performed, the routine EULD tests the state of bit position 1. If bit position 1 is in a binary ZERO, the routine sets the phase bits to binary ZEROS indicating that the next phase to be performed is a final phase. When bit position 1 is a binary ONE indicating that the controller 100 is performing an unload operation as part of a bootload operation, the operation phase code is not modified. The routine EULD then causes the read only memory to branch to a common rewind, load, unload command routine which causes the appropriate command to be transferred to the device followed by a branch to the command termination routine MCMT of FIG. 4. As explained herein, this routine examines the operation phase code bits to ascertain whether the controller 100 has completed the operation.

Referring again to FIG. 2, it is seen that when the device is not in a standby state, the controller 100 executes microinstruction 08 which tests the state of bit 4 of status byte DSSB0 to ascertain whether the device is at BOT. When the device is not at BOT, the controller 100 executes microinstructions 08A-08E which test bit positions 0 and 1 of the operation phase code in addition to the last command. As seen from FIG. 2, when the operation phase code is 00, the routine tests bit 1 of byte DSSB1 to ascertain whether the last command was a write command. If it was not, the controller 100 loads the starting location of rewind routine ERWD into history register 104-17 and sets the operation phase code bits to 110. If it was a write command, the controller 100 branches to routine EXWM:FJE of FIG. 3. This form part of the executive write routine EXWM. The routine also includes at least one microinstruction which inserts a new operation phase code into scratch pad memory 107. This corresponds to a code of 10X which signals the controller 100 that the operation is not completed following execution of the write as explained herein. When the operation phase code has a value X1, the controller 100 branches to microinstructions 17–19 as discussed herein.

When the controller 100 is at the beginning of tape BOT position, it branches to microinstructions 17–19 for testing the operation phase code bits to ascertain which of the two read routines EXRM:BL2 or EXRM:B1 are are to be selected for execution. When bits 0 and 1 of the operation phase code have a value 01, the controller 100 loads the starting location of routine EXRM:BL2 into history register 104-17 and sets the operation phase code bits to ZEROS. When the bits 0 and 1 have a value 1X or 00, the controller 100 loads the starting location of routine EXRM:BL1 into history register 104-17 and sets the operation phase code bits to 01. Thereafter, the controller executes microinstructions 12-16 which load the operation phase code bits into scratch pad memory 107 and then branch the read only memory to the selected routine.

As indicated by the designations, both routines EXRM:BL1 and EXRM:BL2 form part of a single read executive or main routine EXRM. The routine EXRM includes microinstructions which test the state of the operation phase code bits. However, these microinstructions will only be executed when the controller 100 is performing a read or space operation directed by routine EXRM. Since the bootload routine EBLI is directing the operation of controller 100, the routine EXRM does not normally test and modify the phase operation code bits (i.e. tested and modified during retry operations).

The routine EXRM in addition to other ones of the routines mentioned above upon being completed cause the read only memory to enter command termination routine MCMT illustrated to FIG. 4. As shown, this routine ascertains whether the controller 100 has completed the operation. Additionally, this routine includes a sequence of microinstructions for initiating a retry of commands when indicated, with provision for modifying the operation phase code bits preventing the controller 100 from terminating its operation. For further details regarding the manner in which the controller 100 performs a retry operation, reference may be made to the aforementioned copending patent application of Myrl Kennedy Bailey, Jr. and George J. Barlow.

When no retry is required, the routine MCMT executes microinstructions for testing the two high order operation phase code bits. When the bits are ZERO, the controller 100 terminates operation in a conventional manner (i.e. low order bit used to identify retry operation from other types of operations). When the two operation phase code bits are not ZERO, the controller 100 returns to the command decode routine which decodes again the same command byte.

From the foregoing, it is seen that through the use of an operation phase code, the controller 100 is able to execute a series of operations required to complete a given operation. It is able to accomplish this with introduction of a small number of microinstructions to the routines normally stored in read only memory used to execute commands. Further, this arrangement enables the controller to start a multiphase operation or a series of operations when in any given state since the operation phase code bits signal the controller automatically of its status. Also, certain bits may be used to identify special types of operations, e.g. retry operation.

For the purpose of simplification, the operation of the present invention has been illustrated through flow charts which disclose the sequences of microinstructions and the various operations performed by such microinstructions. The exact coding pattern for individual microinstructions were not disclosed since the engineer is free to select alternate forms of coding. For further details and insight into techniques for deriving such coding and to provide additional background information concerning the system and component features, reference may be made to the documents mentioned in addition to the following texts: Computer Organization and Microprogramming by Yoahan Chu published by Prentice-Hall Inc., copyrighted 1972; Microprogramming Principles and Practice of Samir S. Husson published by Prentice-Hall Inc., copyrighted 1970; and Digital Systems: Hardware Organization and Design by Frederick J. Hill and Gerald R. Peterson published by John Wiley & Sons, Inc., copyrighted 1973.

It will be appreciated to those skilled in the art that many changes may be made to the present invention. For example, while the invention has been described with respect to several specific types of operations, it should be clear that the invention is applicable to other types of operations. Also, the invention has applicability to other types of peripheral controllers or units.

While in accordance with the provisions and statutes there has been illustrated and described the best form of the invention known, certain changes may be made to the system described without departing from the spirit of the invention as set forth in the appended claims and that in some cases, certain features of the invention may be used to advantage without a corresponding use of other features.

What is claimed is:

1. A peripheral controller operative to control a plurality of input/output devices in response to command byte signals received from a processing system, said controller comprising:

an addressable control store having a plurality of storage locations for storing a plurality of microprogram routines independently used to execute different input/output operations in response to different codings of said command byte signals, each of said microprogram routines including a plurality of microinstructions having a predetermined sequence of microinstructions, said control store including decoder means for generating control signals in response to microinstructions read out from said control store;

addressable storage means operatively coupled to said control store, said storage means including a plurality of locations for storing status and control information signals used in performing said input/output operations, a predetermined one of said storage locations for storing in response to a command specified by said command byte signals a bit pattern coded for indicating when said controller is executing a series of operations requiring execution of a plurality of said microprogram routines; and, processing means coupled to receive signals from said control store, said decoder means and said storage means, said processing means being operative in response to control signals generated by said decoder means in response to said predetermined sequence of microinstructions to access said coded bit pattern contents from said predetermined location of said storage means and test the value of said bit pattern for determining when said controller is executing said series of operations in response to said command.

2. The controller according to claim 1 wherein said control store includes a sequence of microinstructions of a command termination routine arranged to be executed following the execution of each of said plurality of microprogram routines, said routine being coded for including test microinstructions, said processing means being operative in response to control signals generated by said decoder means in response to said test microinstructions of said termination routine to access said bit pattern, said processing means being operative upon detecting that said bit pattern contains a predetermined value to generate a signal indicating to said controller the completion of said series of operations.

3. The controller of claim 2 wherein said processing means is operative upon detecting that said coded bit pattern does not contain said predetermined value to cause said control store to access again one of said microprograms to continue execution of said series of operations with reference to said command byte signals.

4. The controller of claim 2 wherein said predetermined value corresponds to an all ZERO binary code for a normal series of operations.

5. The controller of claim 3 wherein said bit pattern when coded to contain a non-ZERO binary code causes said controller to continue execution of said normal series of operations.

6. The controller of claim 1 wherein input/output devices are magnetic tape devices and certain ones of said plurality of microprogram routines are coded to contain microinstructions for enabling the transfer of a block of byte signals between a selected one of said tape devices and said processing system in response to said command byte signals.

7. The controller of claim 6 wherein said command byte signals are coded to specify a bootload command for transferring a first block of said byte signals from said selected one of said type devices to said data processing system, said controller further including;
branch control means coupled to said control store, and to said processing means, said branch control means being responsive of said command byte signals to branch to a predetermined one of said plurality of microprogram routines and said decoder means being operative in response to said test microinstructions to generate signals for conditioning said processing means to test the contents of other locations of said storage means for determining the state of said device and to test said bit pattern for selecting which one of a group of said plurality of microprograms is to be accessed next in accordance with said state of said tape device.

8. The controller of claim 7 wherein said test microinstructions include microinstructions containing predetermined bit patterns, said decoder means being operative in response to said microinstructions to modify said bit pattern stored in said predetermined location of said storage means by replacement with said predetermined bit patterns of said microinstructions.

9. The controller of claim 8 wherein said microinstructions are coded to contain values of 110, 010 and 000 for specifying an unload rountine, load and rewind routine, space to tape mark routine and read routines respectively.

10. The controller of claim 9 wherein said control store is conditioned by signals indicative of the status of said device to access selectively said unload, load, reqind, space to tape mark and read routines in a predetermined sequence for causing said tape device to perform operations of loading, rewinding, spacing and reading respectively and selecting from said control store only the ones of said last mentioned routines for having said selected tape device perform those operations required for reading said block for transfer to said data processing system.

11. A peripheral controller for controlling the operation of at least one input/output device, said controller comprising:
an addressable read only memory including a plurality of storage locations for storing a plurality of microprograms independently used for executing different operations involving said device specified by command signals received by said controller from a data processing system, each of said microprograms including a plurality of microinstructions, said read only memory further including a sequence of microinstructions common to said plurality of microprograms for terminating said controller's execution of an operation specified by said command signals, said read only memory including decoder circuits for generating signals in response to microinstructions read out from said read only memory; and
register means operatively coupled to said read only memory, said register means being arranged to store a plurality of operation phase bits coded to specify a value which designates when said controller is executing a series of operations carried by different ones of said microprograms for successfully completing said operation specified by said command signals;
said decoder circuits being operative upon the read out of predetermined ones of said microinstructions in said sequence to generate signals for testing said value of said operation phase bits for signaling when said controller has completed said series of operations requiring execution of a series of microprograms.

12. The controller of claim 11 wherein each of said plurality of microprograms includes a predetermined sequence of microinstructions, said decoder circuits being operative in response to read out of said sequence of microinstructions to generate signals for testing the values of the operation phase bit contents of said register means for establishing the manner in which the corresponding one of said microprogram is to be executed and for modifying said operation phase bit contents for selecting of a next one of said microprograms for causing said controller to execute a next operation in said series.

13. The controller of claim 12 wherein said test microinstruction sequence of a last in said series of microprograms conditions said decoder circuits to generate signals for setting said operation phase bits to a predetermined value for indicating completion of said series of operations.

14. The controller of claim 13 wherein said predetermined value corresponds to an all ZERO binary code for a normal series of operations.

15. The controller of claim 12 wherein said test microinstruction sequence in each of said series of microprograms conditions said decoder circuits to generate signals for setting said operation phase bits to a non ZERO binary code for signaling continued execution of said normal series of operations.

16. The controller of claim 12 wherein said input/output device is a magnetic tape device and certain ones of said plurality of microprograms are coded to contain microinstructions for enabling the transfer of a block of byte signals between said device and said controller.

17. The controller of claim 16 wherein said command byte signals are coded to specify a bootload command for transferring a first block of said byte signals from said device to said data processing system, said controller further including:
   device indicator storage means for storing signals indicating the status of said device; and,
   branch control means coupled to said control store and to said processing means, said branch control means being responsive of said command byte signals to branch said control store to a predetermined one of said plurality of microprogram routines and said decoder means being operative in response to said predetermined sequence of said microinstructions to generate signals for conditioning said processing means to test the contents of said device indicator storage means for determining the state of said device and to test the value of said bit pattern for selecting which one of a series of said plurality of microprograms is to be accessed next in accordance with said state of said device.

18. The controller of claim 17 wherein said predetermined sequence of microinstructions include microinstructions containing predetermined bit patterns, said decoder circuits being operative in response to said microinstructions to modify the value of said bit pattern stored in said predetermined location by replacement with said predetermined bit patterns of said microinstructions.

19. The controller of claim 18 wherein said microinstructions are coded to contain values of 110, 010 and 000 for specifying unload, load and rewind routine, space to tape mark routine and read routines respectively.

20. The controller of claim 19 wherein said control store is conditioned by signals indicative of the status of said device to access selectively said unload, load, rewind, space to tape mark and read routines in a predetermined sequence for causing said tape device to perform operations of loading, rewinding, spacing and reading respectively and selecting from said control store only the ones of said last mentioned routines for having said selected tape device perform only those operations required for reading said block for transfer to said data processing system.

21. A method for having commands involving an input/output device executed by a microprogrammed peripheral controller including a plurality of microprograms stored in a control element of said controller, said method comprising the steps of:
   storing a microprogram common to said plurality of microprograms in said control element, said microprogram being coded including a predetermined sequence of microinstructions;
   storing signal representations of a phase code in a register for indicating each time said controller is required to execute a series of operations in response to one of said commands;
   testing said phase code signals for a predetermined value during execution of said common microprogram upon completing execution of different ones of said plurality of microprograms; and,
   generating a control signal upon detecting said predetermined value for indicating to said controller the completion of said series of operations.

22. The method of claim 21 wherein said method further includes the steps of:
   including in different ones of said plurality of microprograms a predetermined sequence of microinstructions; and,
   modifying said phase code signals in response to said predetermined sequence of microinstructions during the execution of each said different ones of said microprograms for selecting a next microprogram in said series.

23. A method for enabling a microprogrammed peripheral controller to execute commands received from a data processing system involving an input/output device, said method comprising the steps of:
   storing a plurality of microprograms, each including a predetermined sequence of microinstructions, in a microprogrammed control element of said controller;
   storing signal representations of an operation phase code in a register for indicating each time said controller is required to execute more than a single operation in response to a command; and,
   modifying said operation phase code signals to a predetermined value during the execution of said predetermined sequence of one of said microprograms for signaling when all of the operations required for successful execution of said command have been completed.

* * * * *

UNITED STATES PATENT OFFICE
CERTIFICATE OF CORRECTION

PATENT NO. : 3,972,030
DATED : July 27, 1976
INVENTOR(S) : Myrl Kennedy Bailey, Jr.

It is certified that error appears in the above-identified patent and that said Letters Patent are hereby corrected as shown below:

Column 10, line 9, delete "qind" and insert --wind--.

Signed and Sealed this

Seventeenth Day of May 1977

[SEAL]

Attest:

RUTH C. MASON
Attesting Officer

C. MARSHALL DANN
Commissioner of Patents and Trademarks